UNITED STATES PATENT OFFICE.

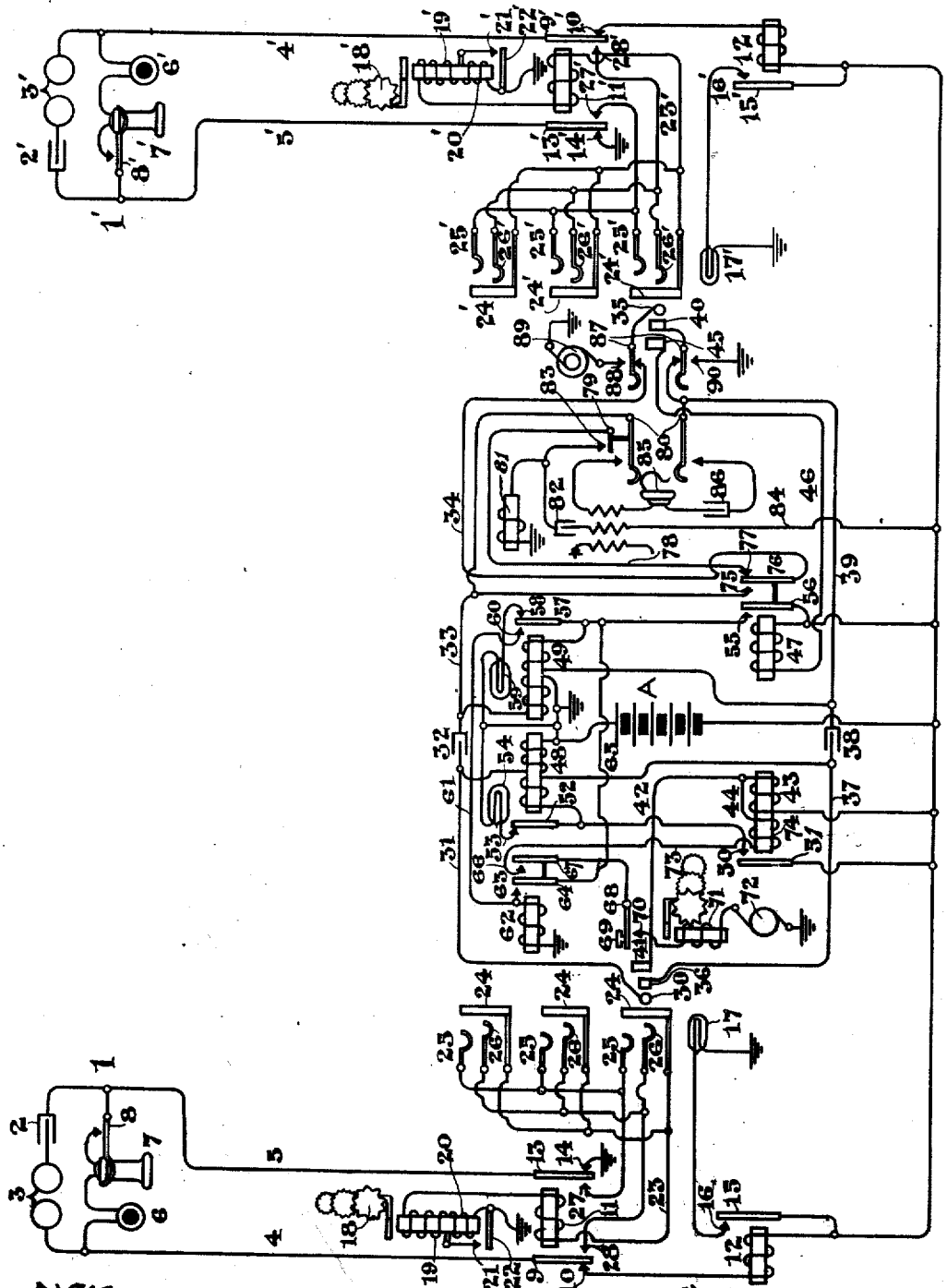

WILLIAM REID, OF CHICAGO, ILLINOIS, ASSIGNOR TO KELLOGG SWITCHBOARD AND SUPPLY COMPANY, OF CHICAGO, ILLINOIS, A CORPORATION OF ILLINOIS.

SERVICE-METER SYSTEM.

No. 929,708.      Specification of Letters Patent.      Patented Aug. 3, 1909.

Application filed December 5, 1907. Serial No. 405,141.

*To all whom it may concern:*

Be it known that I, WILLIAM REID, a citizen of the United States, residing in Chicago, county of Cook, and State of Illinois, have invented certain new and useful Improvements in Service-Meter Systems, of which the following is a specification.

My invention relates to service meter systems for telephone lines, and especially to systems of the central energy type having three conductor multiple jacks at the central office. In systems of this character it has been the practice to place a service meter for the line in series or in multiple with the coil of the cut-off relay and to actuate the service meter by impressing upon the circuit a voltage greater than that necessary for the actuation of the cut-off relay. When this is done it has been found that a reversal of the current through the supervisory apparatus connected with the cord circuit occurs which causes a demagnetization and remagnetization of the sleeve supervisory relay of the cord circuit which sometimes has sufficient reactive effect to throw the service meter from its actuated position back to its normal position, whereby a second call could be registered against the subscriber.

The object of my present invention is to overcome the effect of such reactive current and to prevent the sleeve supervisory relay of the cord circuit from having its magnetism reversed by the reversal of the current through its coil.

Another object of my invention is the arrangement of the windings of the service meter itself, whereby the normal current through the meter when the meter is unactuated will be partially overcome by the back turns on the meter core, these back turns being shunted when the meter is fully actuated, whereby the full effect of the current in the coil will be accessible for holding the meter in its actuated position.

Other objects of my invention will be brought out in the following description and claims.

My invention is illustrated in the accompanying drawing in which all apparatus is shown in its normal and unactuated condition and is understood to be shown only in conventional form and to be typical of any apparatus which may be adapted to the same use.

The calling subscriber's station 1 has the condenser 2 and annunciator 3 permanently connected between the line conductors 4 and 5, and the transmitter 6 and receiver 7 in a circuit maintained normally open by contacts of the switch hook 8. The line conductor 4 connects with the live pole of battery A at the central office through contacts 9 and 10 of cut-off relay 11 and the coil of line relay 12; and the line conductor 5 connects with the ground pole of battery A through contacts 13 and 14 of cut-off relay 11. Line relay 12 controls the normally open contacts 15 and 16 in the circuit of the line lamp 17. Service meter 18 has the actuating coil 19 and the differential coil 20 normally connected in series, one terminal of coil 20 being connected with earth, and the other terminal of coil 20 being adapted to be connected with earth by contacts 21 and 22 when the meter is actuated. The other terminal of coil 19 is connected through the coil of cut-off relay 11 and conductor 23 with the sleeve contacts 24 of the answering and multiple jacks. The tip and ring contacts 25 and 26 of these jacks are connected to the inside contacts 27 and 28 of the cut-off relay 11.

The called line and substation are similarly equipped with apparatus of the same general character, the corresponding apparatus of this line being designated by like figures with the suffix "'".

The cord circuit for connecting these lines for conversation has the tip and ring talking strands. The tip strand extends from the tip 30 of the answering plug through conductor 31, condenser 32 and conductors 33 and 34 to the tip contact 35 of the calling plug, while the ring strand extends from the ring contact 36 of the answering plug through conductor 37, condenser 38 and conductor 39 to the ring contact 40 of the calling plug. In addition to the talking strands, each connecting cord has a sleeve strand, the sleeve 41 of the answering plug being connected through conductor 42 and the coil 43 of sleeve relay 44 with the live pole of battery A, and the sleeve contact 45 of the calling plug being connected through conductor 46 and the coil of relay 47 with the live pole of battery A.

The cord circuit is provided with a pair of supervisory relays 48 and 49, relay 48 having a coil connected between tip conductor 31 and the ground pole of battery A, and a second coil connected between the sleeve conductor 37 and contact 50 of relay 44, this contact 50 being adapted to be connected through contact 51 with the live pole of battery A when the relay 44 is actuated. The contact 50 of relay 44 also connects through the normally closed contacts 52 and 53 of relay 48 with the supervisory signal 54, the other terminal of that signal being connected with the ground pole of battery A. Relay 49 also has two coils, one coil being connected between tip conductor 33 and the ground pole of battery A, and the other being connected between the sleeve conductor 39 and the contact 55 of relay 47, contact 55 being adapted to connect through the contact 56 with the live pole of battery A when relay 47 is actuated. Contact 55 is also normally connected through closed contacts 57 and 58 with the supervisory signal 59, the other terminal of that signal being connected with the ground pole of battery A. Relay 49 also has the normally open contact 60 adapted to connect with contact 57 when the relay is actuated, this contact 60 connecting through the conductor 61 with the coil of relay 62, the conductor 61 being also connected with the contact 63 of relay 62, which is adapted to connect through the contact 64 of relay 62, and conductor 65 with the contact 55 of relay 47. Relay 62 also has the normally open contacts 66 and 67, contact 67 being connected with the contact 68 of the service meter key 69, this key having the normally open contact 70 connecting through the coil of the position meter 71 with one pole of the direct current generator 72. The other contact 66 of relay 62 connects through conductor 73 and the coil 74 of relay 44 with the sleeve conductor 42 of the cord circuit.

Supervisory relay 47 has the normally open contacts 75 and 76 normally maintaining the separation between the portions 33 and 34 of the tip talking strand. Contact 76 is normally connected through contact 77 and conductor 78 with the auxiliary contact 79 of the operator's listening key 80, contact 79 being adapted to connect with the impedance coil 81 and the condenser 82 through contact 83 when the listening key is actuated. The other terminal of condenser 82 is connected through the tertiary winding of the operator's induction coil and conductor 84 with the live pole of battery A. The secondary of the operator's induction coil, the operator's receiver 85 and the condenser 86 are adapted to be placed in a bridge between the talking conductors by the actuation of the listening key 80.

The calling end of the cord circuit is provided with the operator's ringing key 87 having normally closed series contacts in both the tip and ring conductors of the cord circuit, the tip spring of the key being adapted when actuated to connect with the contact 88, and thence through the ringing current generator 89 to earth, and the sleeve spring of the ringing key being adapted to connect through the contact 90 with earth.

In the operation of the system thus described the calling subscriber at substation 1 removes his receiver 7 from the switch hook 8 and completes a circuit from the live pole of battery A through the coil of the line relay 12, contacts 10 and 9 of cut-off relay 11, line conductor 4, transmitter 6, receiver 7, switch hook 8, line conductor 5 and contacts 13 and 14 of cut-off relay 11 to ground. Current in this path actuates line relay 12 closing its contacts 15 and 16 in the circuit of the line lamp 17. This displays the line signal and indicates to the operator that a connection is desired by the subscriber connected with the jack so designated.

Upon observing the signal the operator inserts her answering plug into the jack of the calling line and causes the tip, ring and sleeve contacts 30, 36 and 41 of the answering plug to register with the tip, ring and sleeve contacts 25, 26 and 24 of the line jack. The circuit is therefore completed from the live pole of battery A through the coil 43 of supervisory relay 44, conductor 42, sleeve contacts 41 and 24 of the plug and jack, conductor 23, the coil of the cut-off relay 11 and windings 19 and 20, in series, of the line service meter to ground. The current in this path is sufficient to actuate both relays 44 and 11 but is not sufficient to actuate the line service meter, partially on account of its non-inductive turns 20, and partially on account of the fact that the battery voltage is not sufficient to overcome the resistance of the service meter to movement. The actuation of cut-off relay 11 moves its contacts 9 and 13 to their abnormal positions and opens the circuit of line relay 12, allowing its contacts 15 and 16 to become separated and causing the line signal 17 to become effaced. The actuation of relay 44 closes its contacts 50 and 51, thus connecting the live pole of battery A with the ring conductor 37 of the cord circuit through one of the coils of supervisory relay 48 and also connecting the live pole of battery A through the contacts 52 and 53 of relay 48 with the signal 54. The signal 54 is, however, not displayed for the reason that a path for current is now completed from the live pole of battery A through contacts 50 and 51 of relay 44, one of the coils of relay 48, the ring conductor 37, the ring contacts 36 and 26 of the plug and jack, contacts 28 and 9 of the cut-off relay, line conductor 4, transmitter 6, receiver 7, contacts of the switch hook 8, line conductor 5, contacts 13 and 27 of the cut-off relay 11, tip contacts 25 and 30 of the jack and plug, tip conductor 31, and the other coil of relay 48 to ground. Current in this path actuates relay 48 separating its contacts 52 and 53 and preventing the display of the signal 54. The operator now throws her listening key 80 and receives the number of the desired subscriber's station. She then raises her calling plug and touches the tip contact of that plug to the sleeve contact of the desired line. If the desired line is busy the sleeve contact will be in connection with the sleeve contact of another cord circuit and will therefore be at a potential higher than that of earth. Current will therefore flow from the sleeve of the jack over the tip 35 of the calling plug, through the series contacts of the operator's ringing key, tip conductor 34, contacts 76 and 77 of the supervisory relay 47, conductor 78, auxiliary contacts 79 and 83 of the operator's listening key 80 to earth through the impedance coil 81. This current will slightly alter the potential at the terminal of the condenser 82 and will cause a partial discharge of that condenser and will therefore cause a disturbance in the tertiary winding of the operator's induction coil, this disturbance being inductively reproduced in the secondary of the induction coil and in the operator's receiver, indicating to the operator that the called line is busy. If the called line is idle, however, no disturbance is heard by the operator and she therefore inserts her calling plug completely into the jack of the desired line causing its tip, ring and sleeve contacts 35, 40 and 45 to register with the tip, ring and sleeve contacts 25′, 26′ and 24′ of the jack. Upon the insertion of the plug a circuit is completed from the live pole of battery A through the coil of supervisory relay 47, conductor 46, sleeve contacts 45 and 24′ of the plug and jack, conductor 23′, coil of cut-off relay 11′ and the windings 19′ and 20′ of the line service meter 18′ to ground. Current in this path actuates relays 47 and 11′ but is not sufficient to actuate the line service meter 18′. The actuation of relay 11′ connects the line conductors 4′ and 5′ with the ring and tip contacts of the jack, and the actuation of relay 47 disconnects the operator's testing apparatus and completes the connection between the portions 33 and 34 of the tip strand of the cord circuit. It also completes the circuit of the supervisory signal 59 by closing the contacts 55 and 56, the signal 59 being now displayed to indicate to the operator that the subscribers are not yet in conversation. The operator now throws her ringing key 87 and impresses alternating current from the ringing generator 89 through contact 88 of the ringing key, the tip contacts 35 and 25′ of the plug and jack, contacts 27′ and 13′ of the cut-off relay 11′, line conductor 5′, condenser 2′, annunciator 3′, line conductor 4′, contacts 9′ and 28′ of the cut-off relay 11′, ring contacts 26′ and 40 of the jack and plug and the contact 90 of the ringing key 87 to ground. This current being alternating passes through the condenser 2′ and sounds the annunciator 3′.

When the called subscriber answers his call, the ringing key being now released, a path is completed from the live pole of battery A through contacts 55 and 56 of relay 47, one of the coils of relay 49, the ring conductor 39 of the cord circuit, ring contacts 40 and 26′ of the plug and jack, contacts 28′ and 9′ of the cut-off relay 11′, line conductor 4′, transmitter 6′, receiver 7′, the now closed contacts of the switch hook 8′, line conductor 5′, contacts 13′ and 27′ of cut-off relay 11′, tip contacts 25′ and 35 of the jack and plug, tip conductor 34, contacts 76 and 75 of sleeve relay 47, tip conductor 33 and the other coil of supervisory relay 49 to ground. Current in this path actuates the relay 49 separating its contacts 57 and 58 and effacing the supervisory signal 59. This indicates to the operator that the called subscriber has answered his call, and it is now the duty of the operator to register a call against the calling subscriber. The actuation of relay 49 connects battery through contacts 57 and 60 of that relay, conductor 61 and the coil of relay 62 to ground. This actuates the relay 62 and completes a locking circuit through its own contacts 63 and 64 and the conductor 65, this locking circuit being in parallel with the contacts 60 and 57 of relay 49. The actuation of relay 62 closes its contacts 66 and 67. The operator now depresses the service meter key 69 and completes a circuit from the direct current generator 72, which is of a voltage somewhat higher than that of the main battery A through the coil of the position meter 71, contacts 70 and 68 of the service meter key 69, contacts 67 and 66 of relay 62, conductor 73, the low resistance coil 74 of relay 44, conductor 42, sleeve contacts 41 and 24 of the plug and jack, conductor 23, the coil of cut-off relay 11 and the coils 19 and 20 of service meter 18 to ground. The current in this path actuates both the position meter 71 and the line service meter 18 and does not affect the relay 44, the winding 74 being connected in the direction to magnetize the core of the relay with the same polarity as it was magnetized by the current formerly passing through the coil 43 of that relay. It is true that there will be a reversal of the current passing through the coil 43 but the current through the coil 74 will be of greater value and will overcome the demagnetizing effect of the current through the coil 43. The actuation of the line service meter 18 will close its contacts 21 and 22 and place a shunt about the differential coil 20. Therefore, when the key 69 is released the differential effect of the coil 20 having been removed, the service meter 18 will remain in its actuated condition, the current from the battery A being sufficient to maintain the actuation of this registering device.

When the subscribers have terminated their conversation and have replaced their receivers upon their respective switch hooks the circuits of relays 48 and 49 at the central office are severed and the contacts 52 and 53, and 57 and 58 of those relays are again closed, completing the circuits of the supervisory signals 54 and 59, these signals being displayed to indicate to the operator that the conversation has terminated.

The object of making the relay 62 a locking relay is to give the operator sufficient time in which to actuate the service meter key 69. This may be done even after the conversation has been terminated because the circuit of relay 62 is no longer controlled by contacts of relay 49.

When the operator receives the disconnect signal by the display of the lamps 54 and 59 she removes her calling and answering plugs from their respective jacks and thereby severs the circuits of relays 43 and 47. This allows the cut-off relays 11 and 11' to resume their normal positions and allows the service meter 18 to fall back to its normal position. The removal of the plugs also causes the opening of contacts 51 and 50 of relay 43 and contacts 56 and 55 of relay 47. This opens the circuits of the supervisory signals 54 and 59 and causes those signals to be effaced. The apparatus is now in its normal condition and all of the signals are effaced.

While I have shown and described my invention with respect to certain details and combinations it is to be understood that I do not wish to be too strictly limited thereto, many deviations and modifications being possible without in any way departing from the spirit or scope of my invention.

I claim:

1. In a telephone system, the combination with a telephone line, of a service meter for the line having differentially wound coils normally in series, contacts of said service meter adapted to shunt one of said coils when the meter is actuated, a cord circuit, a pair of sources associated with the cord circuit, one of said sources being connected with the service meter when the cord is connected with said line, and being of insufficient electro-motive force to actuate the service meter, and the other source being adapted to be temporarily connected with the service meter during the connection of the cord with the line, said source being of sufficient electro-motive force to actuate the service meter, substantially as described.

2. In a telephone system, the combination with a telephone line, of a cut-off relay for the line, a service meter connected in series therewith and having a pair of series coils connected differentially, one of said coils having more turns than the other, whereby the magnetizing force of the larger coil will not be entirely overcome by the smaller coil, a pair of contacts associated with said service meter and adapted to shunt one of said coils during the actuation of the meter, a cord circuit to connect with the line having a pair of sources associated therewith, one of said sources being of sufficient electro-motive force to actuate the cut-off relay but not the service meter, and the other being of sufficient electro-motive force to actuate both the service meter and the cut-off relay, the former source being sufficient to maintain the actuation of the cut-off relay and the service meter after the service meter has been once actuated, substantially as described.

3. In a telephone system, the combination with a telephone line, of a service meter for the line connected with one of the contacts of the line jack, a cord circuit to connect with the line, a pair of sources associated with the circuit, a relay for said cord circuit having two coils, one of said coils being permanently connected between said contact of the cord circuit and one of said sources, and the other coil of said relay being adapted to be temporarily connected between the contact of said cord circuit and the other of said sources, current through the two coils being adapted to magnetize the relay to the same polarity, substantially as described.

4. In a telephone system, the combination with a telephone line, of a cut-off relay, a service meter for the line having two coils connected in series, a cord circuit to connect with the line, a pair of sources associated with the cord circuit, a relay associated with the cord circuit having a coil connected in the circuit with one of said sources and said cut-off relay and service meter when the cord is connected with the line, current from said source being insufficient for the actuation of the service meter, a second coil of said relay being adapted to be connected in the circuit between said second source and the cut-off relay and service meter, the second source being of higher potential than the first and being of sufficient electro-motive force to actuate the service meter, the current in the first coil of said relay being reversed in direction when the second source of current is connected, current through the second coil of said relay being sufficient to overcome the magnetic effect of the current in the first coil of said relay, whereby the polarity of said relay will not be changed, substantially as described.

5. In a telephone system, the combination with a telephone line, of a cord circuit to connect therewith, a service meter for the line and a supervisory relay for the cord circuit connected in series when the cord is connected with the line, a pair of coils for said relay, one of said coils being permanently connected in circuit with said service meter when the cord is connected with the line and the other of said coils being adapted to be temporarily connected in the circuit of the service meter during the connection of the cord with the line, current in said latter coil being sufficient for the actuation of the service meter and the current in the former coil being sufficient to maintain the actuation of the service meter thereafter, substantially as described.

6. In a telephone system, the combination with a telephone line, of a service meter and a cut-off relay connected in series, jacks for the line having a contact connected with the coils of the cut-off relay and the service meter, a cord circuit to connect with the line having a contact to register with the contact of the jack, a pair of sources associated with the cord circuit, a supervisory relay having a coil connected between one of said sources and the contact of the cord circuit, and having a second coil adapted to be connected between the other of said sources and said contact of the cord circuit, the first source being of insufficient electro-motive force to actuate the service meter, and the second source being of sufficient electro-motive force to actuate the service meter, and the first source being of sufficient electro-motive force to maintain the actuation of the service meter after it had been actuated by current from the second source, substantially as described.

7. In a telephone system, the combination with a telephone line, of a service meter and a cut-off relay connected in series, jacks for the line having a contact connected with the coils of the cut-off relay and the service meter, a cord circuit to connect with the line having a contact to register with the contact of the jack, a pair of sources associated with the cord circuit, a supervisory relay having two coils, one of said coils being connected between one of said sources and the contact of the cord circuit, said source being adapted to furnish current sufficient for the actuation of the cut-off relay but insufficient for the actuation of the service meter, the second coil of said supervisory relay being adapted to be connected between the contact of said cord circuit and said second source of current, said second source being of a potential sufficient for the actuation of the service meter, the current from said second source through a coil of said supervisory relay being sufficient to maintain said relay magnetized with the same polarity as it was magnetized by the current through its first coil, whereby when the second source is disconnected the magnetism in the core of said supervisory relay will not be reversed and there will be no inductive current pass through the service meter therefrom which would demagnetize it and render it capable of a second registration, substantially as described.

8. In a telephone system, the combination with a telephone line, of a service meter for the line having differentially wound coils of unequal numbers of turns, and means for shunting one of the coils of said service meter whereby the current in the other coil will actuate the meter, substantially as described.

Signed by me at Chicago, county of Cook, and State of Illinois, in the presence of two witnesses.

WILLIAM REID.

Witnesses:
 CLIFFORD C. BRADBURY,
 MARJORIE E. GRIER.